May 16, 1967 P. N. ERICKSON 3,320,087
METHOD OF PROTECTING SURFACE FROM FIRE
Filed Nov. 6, 1962
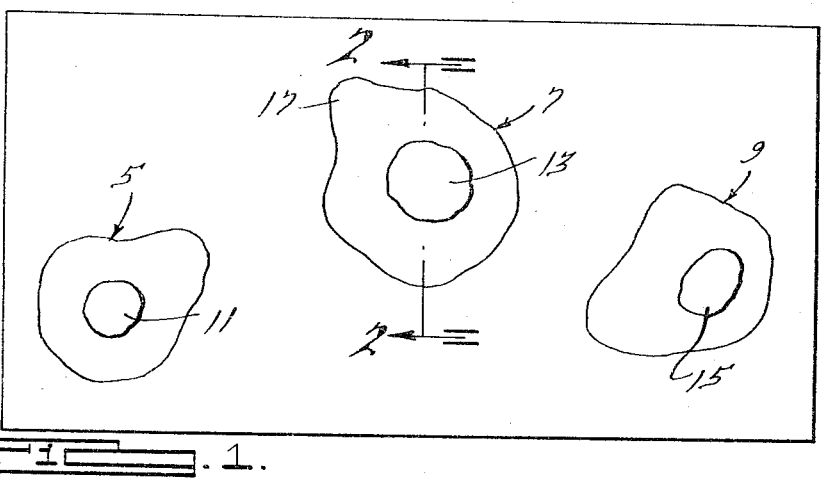
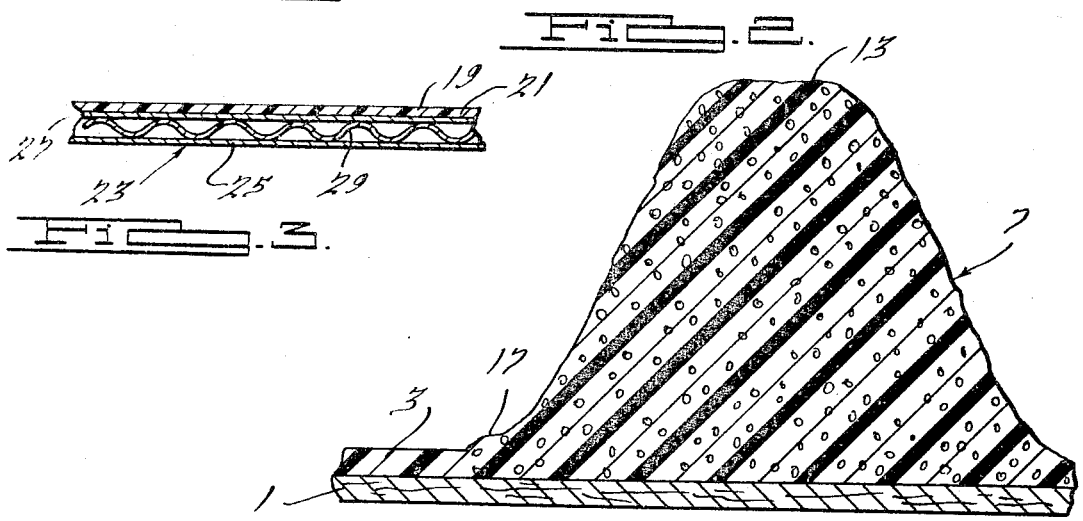
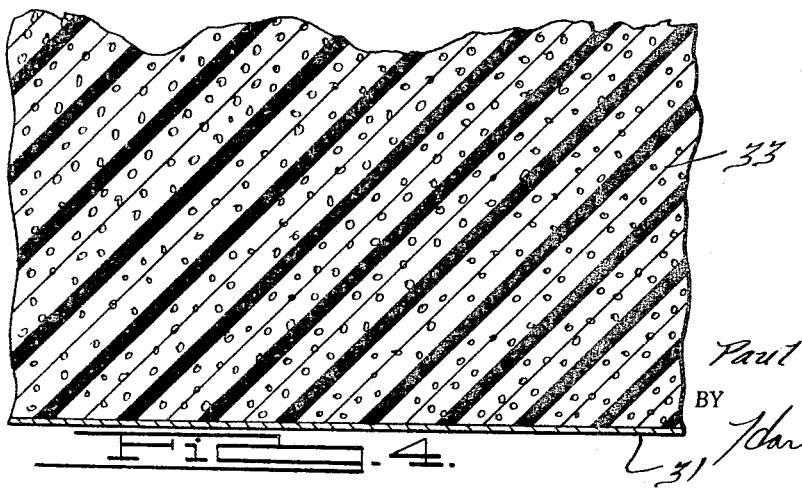
INVENTOR.
Paul N. Erickson

United States Patent Office 3,320,087
Patented May 16, 1967

3,320,087
METHOD OF PROTECTING SURFACE FROM FIRE
Paul N. Erickson, Birmingham, Mich., assignor to Evans Products Company, Plymouth, Mich., a corporation of Delaware
Filed Nov. 6, 1962, Ser. No. 235,895
5 Claims. (Cl. 117—137)

The present invention relates to compositions of the type which are useful in fire-proofing combustible materials, in retarding the spread of fire and in adhering parts together by the application of heat in the absence of pressure. In one of its particular forms this invention relates to liquid compositions which form adherent coatings on a variety of substrates by air-drying and which coatings swell or rise upon the application of a flame or heat to form a thick self-sustaining cellular layer capable of withstanding extremely high temperature flames and of insulating combustible materials therefrom. In another particular form this invention relates to compositions which cure in extremely short time periods to bond surfaces together without the application of externally applied pressure.

Heretofore, much effort has been expended in the search for materials capable of fire-proofing combustible materials such as wood, paper, textiles, rubber, synthetic plastics, cellulosic wall board, cardboard, insulation for structural and electrical purposes, etc. and many materials have been proposed and processes suggested for this purpose. For example, it is known to impregnate paper or wood with various water soluble solids such as ammonium phosphate, ammonium sulfate, borax, ammonium sulfamate, or the like, but such procedures are unsatisfactory where the treated surface is exposed to water or high moisture conditions, and at best, such additives only prevent flaming while concurrently permitting flameless combustion. It is also known that certain metallic oxides or sulfides can be applied to textiles or paper by precepitation thereon or therein from multiple baths but such treatments are expensive and justifiable only under certain conditions. It has been proposed in U.S. Patent 2,452,054 to employ intumescent coatings for the purpose of forming an insulation layer when exposed to fire. The coatings disclosed in U.S. Patent 2,452,054 include a urea-formaldehyde resin, a carbonific material such as dextrin, starch or the like, a spumific component such as ammonium sulfate, ammonium sulfamate, or boric acid and may include a swelling agent, such as gum arabic or the like. Such compositions have been found to provide only a limited thickness layer on a surface when contacted by a flame and appear to be susceptible to deterioration of the ability to swell with the passage of time.

It is the primary object of this invention to provide a composition in liquid form which is easily applicable to a wide variety of substrate surfaces to form an adherent uniform coating thereon, which coating is capable of conversion by heat or flame into cellular, self-sustaining layer on the substrate surface many times the thickness of the applied coating.

Another object of this invention is to provide a coating composition which forms an adherent coating on substrate surfaces by air-drying to a film which is abrasion resistant, resistant to moisture and deterioration by aging, and which contains dormant components capable of causing said coating to rise to many times its original thickness upon the applictaion of heat or flame thereto.

A still further object of this invention is to provide a liquid phenol-aldehyde composition modified to include constituents which enable the composition to quickly cure to a solid insoluble state upon the mere application of heat.

Another important object of this invention is to provide a method of adhering or joining materials by merely applying a composition of this invention to one or more of the mating surfaces and applying heat to one of the mating parts to quickly effect a strong bond therebetween.

Another object of this invention is to provide a method adaptable to continuous production which enables the joining of cellular materials to solid materials with an effective strong bond by merely applying heat to the surface of the solid material after the cellular material containing on its mating surface a composition of this invention is positioned on that solid surface.

Other objects and advantageous features of this invention will become apparent upon fully considering the inventive principles set forth in the detailed description and which are illustrated in the accompanying drawings wherein:

FIGURE 1 is a plan view of a surface coated with a composition of this invention wherein spaced portions thereof have been contacted with the direct flame of a butane torch;

FIG. 2 is a sectional view of the coated article of FIG 1 taken on the line 2—2 thereof;

FIG. 3 illustrates a conventional corrugated cardboard surface having on one face thereof an air dried coating of this invention; and FIG. 4 is a sectional view of a metallic substrate coated with a heat-swelled, self-sustaining coating of this invention.

In accordance with this invention, it has been found that aluminum chloride added to an incompletely condensed phenol formaldehyde condensate modifies the curing characteristics of such a condensate to an unexpectedly significant degree when the temperature of the aluminum chloride-phenol formaldehyde condensate mixture is raised thereafter. Such mixtures are storage-stable at low temperatures and are suitable for use as a rapidly curing adhesive for joining a wide variety of types of materials. The mixtures are also suitable for use in forming foam by admixing therewith a catalytic amount of a mineral acid to produce a cellular product having improved resistance to flames and heat. When the aluminum chloride which is present is a hydrated aluminum chloride, the mixture may be applied in liquid or paste form to a variety of substrates susceptible to heat deterioration and upon air-drying, the coating develops a skin which is tough, abrasion resistant, water and moisture resistant and will, when contacted thereafter with a flame or high temperature heat, swell or rise into a self-sustaining thick layer. Compositions which are suitable for these types of uses may be either in the form of liquids which are applicable to substrate surfaces by spraying or brushing, or may be in the form of pastes. Broadly stated, the compositions comprise an A or B-stage phenol-aldehyde condensate, and preferably an A-stage condensate, and about 1% to about 100% by weight of the aqueous resin condensate of aluminum chloride, which aluminum chloride is preferably $AlCl_3 \cdot 6H_2O$. The compositions may optionally include other filler materials such as colloidal silicas, clays, such as kaolin or bentonite, diatomaceous earth, powdered mica or the like, to establish the desired consistency for the composition. For example, a suitable consistency for extrusion into ribbons, rods or the like, is formed by adding about 2% to about 10% of a colloidal silica having a high bulk density, e.g., 2 lbs.–5 lbs. per cubic ft., with the best results having been attained with colloidal silica commercially available under the trademark "Cab-o-sil." Such fillers may be present in the compositions in amounts up to about 20% by weight of the aqueous resin condensate, but preferably are restricted to amounts in the range of about 2% to about 10% by weight of the aqueous resin condensate.

The compositions may also contain a compatible wetting agent, which, while not necessary, is advantageous in certain of the compositions in assuring uniformity of surface coverage and distribution of the solid particles throughout the coating or paste, as will be discussed in more detail hereinafter.

The phenol aldehyde resin which is useful for the purposes of this invention is a foam forming resin which is flowable or pourable under normal temperature and pressure conditions, and is a composition which contains an aqueous acid-curing thermosetting liquid phenolic resin, the resin being an A-stage, resinous product of partial reaction of ingredients comprising a phenol and an aldehyde. The term "a phenol" is intended to include phenol, and similar materials such as m-cresol, resorcinol, 3,5-xylenol, and mixtures thereof. The aldehyde may be any of the aldehydes which is conventionally used for reactions with phenol to produce A-stage or B-stage reaction products such as formaldehyde, furfural, mixtures thereof, etc., with formaldehyde being preferred. The ratio of formaldehyde to phenol is preferably in the range of about 1:1 to about 1.6:1, but higher quantities of formaldehyde up to about 3:1 may be used. The resinous material may be prepared by conventional techniques such as those disclosed in U.S. Patents 2,218,373 issued Oct. 15, 1940, and 2,446,429 issued Aug. 3, 1948, but the condensate, as used herein should contain at least about 55% solids.

The preferred form of phenol aldehyde resin is the partial reaction product of phenol and formaldehyde using a conventional alkaline catalyst such as barium hydroxide the reaction time, temperature, amount of catalyst or other controlling condition being regulated to form an A-stage resin condensate. The water soluble phenol formaldehyde resins such as those described in U.S. Patents 2,034,457 and 2,190,672 may also be used. The resin condensates may satisfactorily have a viscosity at 25° C., in aqueous form containing at least about 55% resin solids, in the range of about 600 to about 60,000 cps.

Wetting agents which are compatible with the aqueous resin condensates of this invention comprise the polyethylene ethers of sorbitan mono-ester of a fatty acid containing from 12–18 carbon atoms, for example, the polyethylene ethers of sorbitan monopalmitate, sorbitan mono-oleate, sorbitan monostearate, etc., which materials are commercially available under the trademark "Tween." It is also suitable to employ esters of polyethylene glycol such as the oleic acid ester, the stearic acid ester, the coconut fatty acid esters, etc. Certain amine containing wetting agents, such as dimethyl ammonium chloride, dodecyl dimethyl amine oxide, hexadecyl dimethyl amine oxide, which are available commercially under the trademarks "Ammonyx T, Ammonyx AO and Ammonyx CO," respectively, are similarly satisfactory for use.

The compositions may be formed by uniformly admixing the selected ingredients and a coating formed by merely applying the mixed ingredients to the surface to be protected by spraying, brushing, rolling, pasting or the like. Within a short time, usually within ¼ hr., the coating develops a top skin which is hard to the touch and the coating is tightly adherent to the substrate surface. It has been found that the compositions of this invention are suitable for application to a wide variety of substrates which are either combustible or which are degenerated by heat such as wood, paper, textiles, cardboard, rubber, synthetic plastics, cellulosic wallboard, insulation such as rigid and flexible foams, and even steel. By merely modifying the consistency of the composition from a thin, watery consistency material which contains a small quantity of aluminum chloride to thick pastes having the consistency of petroleum jelly or petrolatum which contain much higher aluminum chloride concentrations, or additional fillers, it is possible to coat the substrate to be protected even though the surface is vertically disposed. A coating formed from a composition containing 15–30 parts of aluminum chloride .6H$_2$O per 100 parts of phenol formaldehyde resin condensate, having a viscosity at 25° C. in the range of 1,500 cps., to 2,000 cps., which has a thickness of about 1/16" in its air-dried form, will swell, upon the application of the direct flame from a butane torch or an even hotter flame to a height from about ten times to thirty times its original thickness, namely to about 5/8" to about 1¾".

Referring in greater details to the drawing, and particularly to FIGURES 1 and 2, there is shown a wood substrate 1 having on the upper surface thereof the coating of this invention 3 having a number of swelled or raised irregular shaped portions generally designated 5, 7 and 9, respectively. The raised portions 5, 7, 9 were formed by the point application of the flame from a butane torch directly to the coating, generally in the areas designated 11, 13 and 15, respectively. The irregular shape of the raised portions such as 17 of raised portion 7 results from the swirling or sidewise concentration of heat from the open flame in this area to a slightly greater extent than the other portions of the coating surrounding the central spot 13. Portion 7 is slightly larger than portions 5 and 9 as the result of a slightly longer application of the heat from the butane torch and represents about the average height of coating attained, which in this case is approximately 15–18 times the original coating thickness.

FIG. 3 illustrates the coating of this invention 19 adhered to the upper surface 21 of a conventional cardboard material generally designated 23 having a pair of external faces 25, 27 and a conventional corrugator spacing member 29. FIG. 4 illustrates a metallic substrate 31 having on its surface the heat expanded or swelled cellular material 33 such as is formed by the uniform application of heat directly on the upper surface of a coating having an original thickness of 3/16" to ¼" thick. A coating such as coating 33 may be formed, for example, by coating the surface and thereafter positioning the coated surface in an oven at a temperature between 600° F. and 1,000° F.

The compositions of this invention are especially adapted for use in bonding surfaces together. For this purpose, at least one of the surfaces to be joined is provided with a coating of this invention which may be permitted to dry in air or the coated part may be immediately positioned on the mating surface which may also be coated, if desired. With the composition between the surfaces to be joined, it is only necessary to raise the temperature of the article such that the aluminum chloride becomes activated and catalyzes the cure of the phenol formaldehyde resin constituents to thus convert the composition into an insoluble, cured, set condition. It has been observed that the aluminum chloride is activated at temperatures above about 250° F. and when it is activated, gas is liberated and the composition forceably expands and thus migrates into intimate contact with both of the contiguous substrate surfaces and thus strongly binds them together as the material sets to its fully cured condition. It will be appreciated that the temperature employed to effect the curing of the composition may exceed the approximate minimum required temperature of about 250° F. and satisfactory temperatures fall within the range of about 250° F. to about 500° F. The upper temperature is not critical and may be any temperature which does not deteriorate the substrates being joined, and is preferably well above the minimum since the higher temperatures cause the fastest initiation and completion of the bonding cure.

The curing ordinarily is completed in a few minutes, usually less than two minutes, but slightly longer times may be necessary where large surfaces or thick bonds are involved. As a result of the interaction between the aluminum chloride and the phenol formaldehyde resin constituents the pressure expansion of the composition between the parts being joined makes the compositions of this invention particularly suitable for bonding operations in which the forceful penetration of one or more of the surfaces to be joined is necessary or enhances the strength of the resulting bond. For example, in bonding cellular materials to solid flat surfaces or to other cellular materials, it is difficult to obtain sufficient surface area contact to render the bond sufficiently strong, when the adhesive is positioned only on the exposed edge surfaces of the cells or pores of the cellular material. The compositions of this invention readily effect a strong bond between such materials because of the expansion of the composition, at its curing temperature. This expansion causes the composition to be forced into the pores or cells adjacent to the surface being joined and thus increases the surface area covered by the adhesive composition. This characteristic is advantageous in bonding porous materials such as wood or paper or cardboard or textiles or the like to a solid surface member or another porous member. Moreover, the unusually speedy cure without the necessity of the application of external pressure enables the compositions of this invention to be used in continuous production line operations. The weight of the upper material on the lower one being joined thereto is usually sufficient to counteract the pressure created during cure, but for light-weight materials a confining member to prevent displacement may be needed to obtain the strongest bond. In one such operation, flexible urethane foam was adhered to a metal backing by brushing on a composition of this invention to one surface of the flexible urethane foam, placing the coated surface of the foam on the metal and thereafter applying heat to the opposite side of the metal sufficient to raise the temperature of the adhesive above about 250° F. thereby bonding the foam to the metal backing. Continuous bonding of the flexible foam to the metal backing was obtained by feeding a continuous strip of the foam provided with applicator means for applying the coating to the undersurface of the moving strip of foam as it approached the mating surface of the metal strip. The mating surfaces were continuously bonded as the strip and foam layer moved into a heated zone which supplied heat to the lower surface of the metal strip. In this installation the heat was supplied from a hot air gun, but it will be apparent that the hot air gun could be replaced with any other form of heating such as an open flame, infra-red lamps or the like.

The following examples set forth in somewhat greater detail typical compositions and methods for protecting heat-sensitive surfaces from flames and for adhering parts together in accordance with the principles of this invention.

*Example I*

A composition was prepared by admixing 10 parts of an A-stage phenol-formaldehyde resin, containing 58%–62% non-volatiles and having a viscosity at 25° C. of about 800 cps., Bakelite phenolic foaming resin, BRL–2759, 100 parts of an A-stage phenol-formaldehyde resin condensate having 78%–81% non-volatiles and a viscosity at 25° C. between 1,500 cps. and 1,900 cps., Bakelite phenolic foaming resing BRL–2760, and 50 parts by weight of said mixed resinous condensates of $AlCl_3.6H_2O$.

The mixed materials, having the consistency of heavy molasses was applied to a metal surface and after 4–5 minutes the top skin began to harden and the coating turned to a greenish pastel shade and after about 30 minutes the coating was hard and strongly adhered to the surface. The applied coating, when dried, had a thickness of about $\frac{1}{16}''$ and the application of the direct flame from a butane torch to portions of the coating caused the coating to swell and rise to a height of between $\frac{3}{4}''$ and $1''$ from the surface of the metal. Continued application of the butane flame to the top of the raised portion for approximately 15 minutes had no destructive effect on the self-sustaining foam layer on the metal surface and the metal backing only became warm to the touch.

*Example II*

A composition was prepared by mixing 100 parts by weight of phenolic foaming resin, BRL–2759, with $1\frac{1}{2}$ parts by weight of polyoxyethylene sorbitan monopalmitate, Tween 40, 3 parts by weight of methylene chloride and 15 parts by weight of $AlCl_3.6H_2O$. The mixed composition was applied by brushing to the upper surface of a number of cardboard panels and allowed to dry in air. One of the coated panels was held in a vertical position and a butane torch flame applied to it, and the coating swelled to a height of $1\frac{5}{8}''$ from the surface of the cardboard and with the torch in position against the swelled portion of the coating, the coating remained in place without crumbling or charring for 13 minutes, the flame temperature being about 1,500° F. Slightly after 13 minutes had elapsed, the cardboard surface began to char and after 20 minutes a portion of the foam disintegrated from the swirling motion of the gases from the butane torch flame.

Another coated cardboard panel was positioned at the mouth of an oven having a temperature of 1,000° F., with the coated surface facing the interior of the oven. The coating foamed inwardly to a height of about $\frac{3}{4}''$ and the coating remained intact and no charring of the cardboard occurred after 10 minutes. At the end of 10 minutes the oven temperature was raised to 1,060° F. and charring did not begin until a total elapsed time of 15 minutes. The sample was maintained in place and the cardboard did not glow red until a total elapsed time of 28 minutes.

*Example III*

A composition was prepared by mixing 100 parts of phenolic resin BRL–2759 with $1\frac{1}{2}$ parts of Tween 40 and 15 parts of $AlCl_3.6H_2O$. The mixed material had the approximate consistency of maple syrup at room temperature and a portion of the composition was applied by brushing to one surface of a $\frac{3}{8}''$ thick flexible polyurethane foam. The coated surface of the urethane foam was placed in contact with the surface of a $\frac{1}{16}''$ thick steel plate and the temperature of the steel was raised to about 270° F.–300° F. by a hot air blast directed on the opposite surface of the steel. In about 30–40 seconds, slight bubbling and evidence of curing was observed at the line of juncture between the foam and the steel surface, which terminated after about 2 minutes. The heat was removed and the parts allowed to cool. An inspection of the line of juncture between the foam and steel showed a penetration of the composition into the pores of the urethane foam for a distance of about $\frac{1}{8}''$. The bond between the foam and the steel was strong and an attempt to separate the urethane foam from the metal backing member resulted in tearing of the upper portion of the urethane foam without failure at the bond line.

What is claimed is:

1. A method for protecting surfaces susceptible to deterioration by heat and fire which comprises the steps of applying a coating on said surface of a composition comprising (1) an aqueous mass of acid-curing thermosetting liquid, foamable resin, product of partial reaction of ingredients including a phenol and an aldehyde, said mass containing at least about 55% by weight of said reaction product, and (2) about 1% to about 100% by weight, of said aqueous mass of aluminum chloride.

2. A method for protecting surfaces susceptible to deterioration by heat and fire which comprises the steps of applying a coating on said surface of a composition comprising (1) an aqueous mass of acid-curing thermosetting liquid, foamable resin, product of partial reaction of ingredients including a phenol and an aldehyde, said mass containing at least about 55% by weight of said reaction product, (2) about 1% to about 100% by weight of said aqueous mass of aluminum chloride, and (3) up to about 10% by weight of a compatible wetting agent.

3. A method for protecting surfaces susceptible to deterioration by heat and fire which comprises the steps of applying a coating on said surface of a composition comprising (1) a liquid, A-stage phenol formaldehyde condensation product that has been dehydrated to a water content not in excess of 10%, said dehydrated product being soluble in at least an equal weight of water, and (2) about 1% to about 100% by weight of said condensation product of aluminum chloride.

4. A method for protecting surfaces susceptible to deterioration by heat and fire which comprises the steps of applying a coating on said surface of a composition comprising (1) a liquid, A-stage phenol formaldehyde condensation product that has been dehydrated to a water content not in excess of 10%, said dehydrated product being soluble in at least an equal weight of water, and (2) about 1% to about 100% by weight of said condensation product of hydrated aluminum chloride.

5. A method for protecting surfaces susceptible to deterioration by heat and fire which comprises the steps of applying a coating on said surface of a composition comprising (1) a liquid, A-stage phenol formaldehyde condensation product that has been dehydrated to a water content not in excess of 10%, said dehydrated product being soluble in at least an equal weight of water, (2) about 1% to about 100% by weight of said condensation product of aluminum chloride, and (3) up to about 10% by weight of a compatible wetting agent.

References Cited by the Examiner

UNITED STATES PATENTS

| | | |
|---|---|---|
| 1,160,365 | 11/1915 | Baekeland. |
| 2,019,834 | 11/1935 | Vierling et al. 260—29.4 X |
| 2,323,831 | 7/1943 | Menger et al. 260—2.5 |
| 2,376,653 | 5/1945 | Boyer 260—2.5 |
| 2,414,415 | 1/1947 | Rhodes 156—335 |
| 2,446,429 | 8/1948 | Nelson et al. |
| 2,452,054 | 10/1948 | Jones et al. 117—137 X |
| 2,661,341 | 12/1953 | Nason et al. 117—137 X |
| 2,684,953 | 7/1954 | Stilbert et al. 117—137 X |
| 2,881,088 | 4/1959 | Schulenburg 117—137 X |
| 2,956,037 | 10/1960 | Venable 117—137 X |

FOREIGN PATENTS

| | | |
|---|---|---|
| 15,960 | 1900 | Great Britain. |
| 5,130 | 1905 | Great Britain. |
| 540,642 | 10/1941 | Great Britain. |

EARL M. BERGERT, *Primary Examiner.*

J. P. MELOCHE, *Assistant Examiner.*